United States Patent [19]
Tokunaga et al.

[11] Patent Number: 5,834,722
[45] Date of Patent: Nov. 10, 1998

[54] METHOD AND APPARATUS FOR TREATING WASTE GASES BY EXPOSURE TO ELECTRON BEAMS

[75] Inventors: Okihiro Tokunaga; Hideki Namba, both of Gunma-ken; Tadashi Tanaka, Aichi-ken; Yoshimi Ogura, Mie-ken; Yoshitaka Doi; Masahiro Izutsu, both of Kanagawa-ken; Shinji Aoki, Tokyo, all of Japan

[73] Assignees: Ebara Corporation; Japan Atomic Energy Research Institute, both of Tokyo, Japan

[21] Appl. No.: 565,280

[22] Filed: Nov. 30, 1995

[30] Foreign Application Priority Data

Dec. 12, 1994 [JP] Japan ................................ 6-307977

[51] Int. Cl.$^6$ ................................................. B01D 53/00
[52] U.S. Cl. ................................ 204/157.3; 204/157.15; 204/157.46; 204/157.49; 204/158.2; 588/227; 588/243; 588/247; 588/900; 250/492.3; 422/186; 422/186.04
[58] Field of Search ........................... 204/157.15, 157.3, 204/157.46, 157.49, 158.2; 588/227, 243, 247, 900; 250/492.3; 422/186, 186.04

[56] References Cited

U.S. PATENT DOCUMENTS

| | | | |
|---|---|---|---|
| 4,294,674 | 10/1981 | Aoki et al. | 204/157.14 |
| 4,324,759 | 4/1982 | Aoki et al. | 422/62 |
| 4,435,260 | 3/1984 | Koichi et al. | 204/164 |
| 4,882,020 | 11/1989 | Maezawa et al. | 204/157.3 |
| 4,952,231 | 8/1990 | Kaneko et al. | 71/59 |
| 4,961,830 | 10/1990 | Aoki et al. | 204/157.3 |
| 4,969,984 | 11/1990 | Kawamura et al. | 204/157.3 |
| 5,041,271 | 8/1991 | Aoki et al. | 423/234 |
| 5,244,552 | 9/1993 | Namba et al. | 204/157.3 |
| 5,547,643 | 8/1996 | Nomoto et al. | 422/186.04 |

FOREIGN PATENT DOCUMENTS

| | | |
|---|---|---|
| 0 294 658 | 12/1988 | European Pat. Off. . |
| 0 697 235 | 2/1996 | European Pat. Off. . |
| 36 25 720 | 2/1988 | Germany . |
| WO 89/07982 | 9/1989 | WIPO . |
| WO 93/19837 | 10/1993 | WIPO . |

OTHER PUBLICATIONS

Ebara Electron Beam Flue Gas Treatment Process, vol. 1, Jun. 1988, pp. 8, 11, 14, and 22.
Radiat. Phys. Chem., vol. 46, No. 4–6, pp. 1103–1106, 1995, Hideki Namba, et al., "Pilot–Scale Test for Electron Beam Purification of Flue Gas from Coal–Combustion Boiler".
The Third International Symposium on Advanced Nuclear Energy Research, pp. 1–5, H. Namba, et al., "Electron Beam Treatment of Coal–Fired Flue Gas".
"Effects of Powdery Silica on $NO_x$ and $SO_2$ Removals by Electron Beam Irradiation in Coal–Fired Exhaust Gas", vol. 21, No. 7, 1985, pp. 629–634 (with partial English translation).
Patent Abstracts of Japan, vol. 16, No. 383 (C–0974), Aug. 17, 1992, JP–A–4 122 416, Apr. 22, 1992.
Database WPI, Derwent Publications, AN 86–248172, JP–A–61 174924, Aug. 6, 1986.
Database WPI, Derwent Publications, AN 05–202483, JP–A–07 031 844, Feb. 3, 1995.

Primary Examiner—Cecilia J. Tsang
Assistant Examiner—C. Delacroix-Muirheid
Attorney, Agent, or Firm—Oblon, Spivak, McClelland, Maier & Neustadt, P.C.

[57] ABSTRACT

The improved method for treating waste gases by exposure to electron beams which comprises adding ammonia to a waste gas containing sulfur oxide ($SO_x$) and/or nitrogen oxides ($NO_x$) and thereafter exposing the gas to an electron beam so as to remove the sulfur oxides and/or nitrogen oxides therefrom is characterized by first mixing ammonia gas uniformly with air, then forming a homogeneous gas-liquid mixture from said gaseous mixture and water, and spraying said homogeneous mixture into a reactor. Efficient desulfurization can be realized even if the temperature of the waste gas being treated is fairly high at the exit of the reactor and the concentration of ammonium sulfamate in the by-product ammonium sulfate can be reduced.

6 Claims, 3 Drawing Sheets

METHOD AND APPARATUS FOR TREATING WASTE GASES BY EXPOSURE TO ELECTRON BEAMS

BACKGROUND OF THE INVENTION

This invention relates to a method for treating waste gases by exposing them to electron beams, and comprises adding ammonia to a waste gas containing sulfur oxides ($SO_x$) and/or nitrogen oxide ($NO_x$) and thereafter exposing the gas to an electron beam so as to remove the sulfur oxides and/or nitrogen oxides therefrom. The invention also relates to an apparatus for implementing the method.

When a waste gas containing sulfur oxides and/or nitrogen oxides is treated by first adding ammonia to the gas and then exposing the gas to an electron beam so as to remove the sulfur oxides and/or nitrogen oxides therefrom, the efficiency of removal of the sulfur oxides (hereunder on occasion, referred to simply as "percent desulfurization") tends to increase under lower temperature conditions. This problem has conventionally be dealt with by lowering the temperature of the waste gas in a water-sprayed cooling tower before it is directed to the reactor, with ammonia being added at the entrance of said reactor and the gas being then exposed to an electron beam. Occasionally, water is sprayed not only in the cooling tower located upstream of the reactor but also at the entrance of the reactor and in this case water is supplied separately from the ammonia gas.

Another problem with the prior art method is that the percent desulfurization is highly sensitive to the temperature of the waste gas to be treated and in order to achieve efficient desulfurization, the temperature of the waste gas at the exit of the reactor has to be lowered close to its dew point but in that case not all of the water sprayed will evaporate, thus leading to the formation of waste water or dew formation on the surface of the duct running downstream of the reactor.

In a particular case where a waste gas containing sulfur oxides is treated by first adding ammonia to the gas and then exposing the gas to an electron beam so as to remove the sulfur oxides, ammonium sulfate forms as a by-product; in the conventional process of this treatment, ammonium sulfamate which is harmful to plant-life is generated together with ammonia sulfate in an amount that is by no means negligible and in order to use the by-product ammonia sulfate as a fertilizer, the sulfamate has to be removed.

SUMMARY OF THE INVENTION

The present invention has been accomplished under these circumstances and has as its object the provision of a technique by which efficient desulfurization can be realized even if the temperature of a waste gas being treated is fairly high at the exit of the reactor and which is capable of reducing the concentration of ammonium sulfamate in the by-product ammonium sulfate.

Other objects and advantages of the present invention may become apparent to those skilled in the art from the following description and drawings.

DETAILED DESCRIPTION OF THE INVENTION

Figure 1:
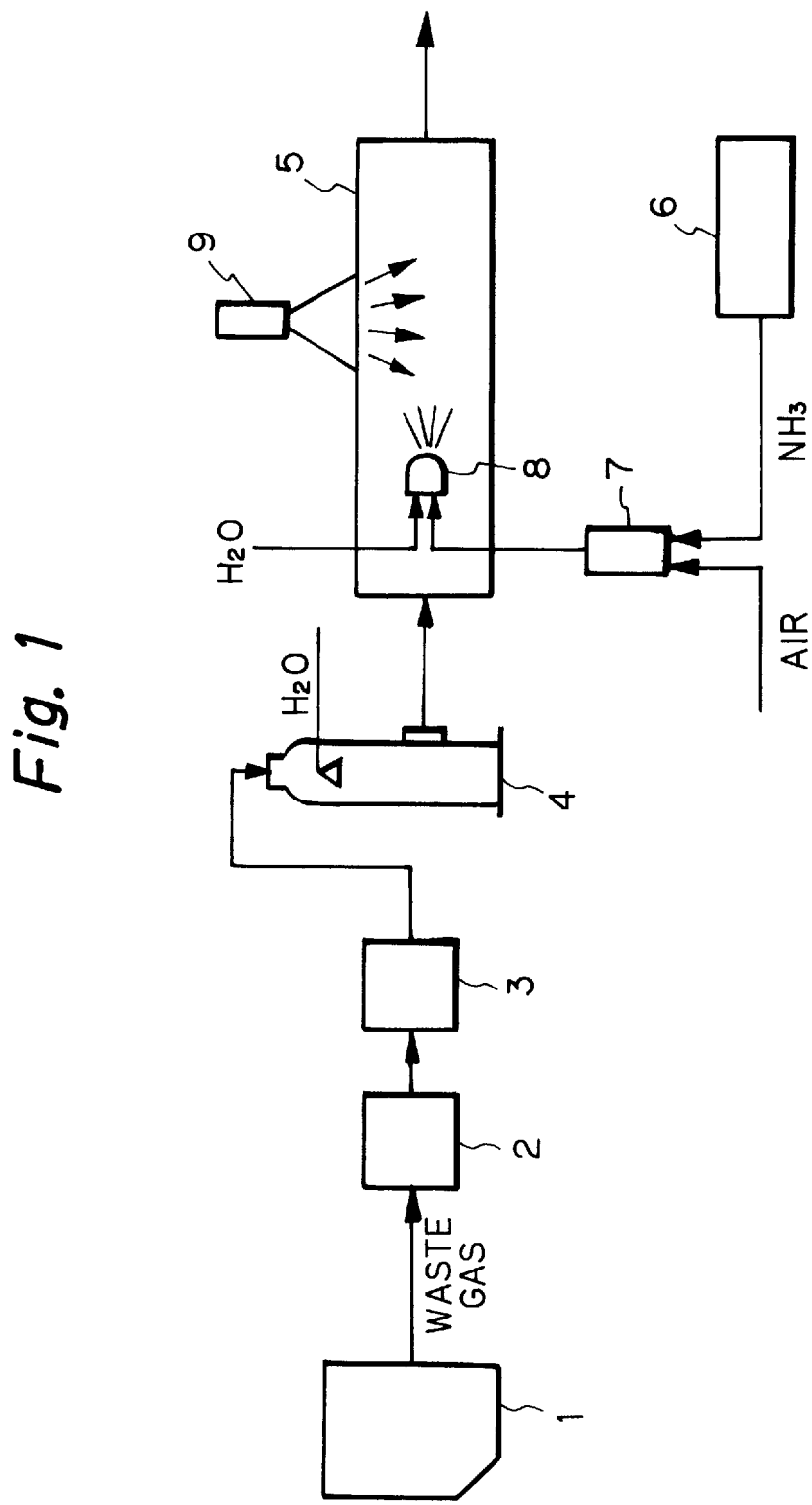
FIG. 1 is a flow sheet for the method of the invention for treating waste gases by exposure to an electron beam which comprises forming a homogeneous gas-liquid mixture from water and a mixture of ammonia gas and air and then spraying the homogeneous mixture into a reactor.

This object of the invention can be attained by first mixing ammonia gas uniformly with air, then forming a homogeneous gas-liquid mixture from said gaseous mixture and water, and spraying said homogeneous mixture into a reactor.

The ratio of water to the gaseous mixture of ammonia gas and air depends on various factors such as the structure of the two-fluid nozzle used, the pressure of the gases to be added and the pressure of water to be sprayed; generally, the applicable ratio ranges from 0.1 to 20 $L/m^3$. If the ratio of water to the gaseous mixture of ammonia gas and air is less than 0.1 $L/m^3$, there is a likelihood for the failure to achieve efficient desulfurization and there also occurs the disadvantage of reduced effectiveness in suppressing the generation of ammonia sulfamate. On the other hand, if the ratio exceeds 20 $L/m^3$, not all of the water sprayed will evaporate, leading to the formation of waste water or dew formation on the surface of the duct running downstream of the reactor.

Ammonia should be used in amounts that are determined chiefly as a quantity necessary to convert sulfur oxides and/or nitrogen oxides to ammonium sulfate and/or ammonium nitrate, respectively but other factors should also be taken into consideration to determine the exact amount of ammonia to be used, such as the required percent desulfurization, the required percent denitration and the concentration of leaking ammonia, as expressed by the following equation:

$$NH_3(kg/h) = Q \times \left[ 2\,SO_x \times \frac{\eta SO_x}{100} + NO_x \times \frac{\eta NO_x}{100} + C_{NH_3} \right] \times 10^{-6} \times \frac{17}{22.4}$$

where
- Q: the amount of waste gas in $m^3$ N/h;
- $SO_x$: the concentration of $SO_x$ in ppm:
- $NO_x$: the concentration of $NO_x$ in ppm;
- $^cNH_3$: the concentration of leaking ammonia in ppm;
- $\eta SO_x$: the required percent desulfurization; and
- $\eta NO_x$: the required percent denitration.

Water should be used in the amount that is eventually required to adjust the temperature of the waste gas at the exit of the reactor to lie within the range from the dew point of water to no more than 100° C. In the method of treatment contemplated by the invention, a waste gas to which ammonia gas has been added is exposed to an electron beam so that $SO_x$ is converted to ammonium sulfate and $NO_x$ to ammonium nitrate, whereupon heat is generated by the reactions expressed by the following schemes to elevate the temperature of the waste gas being treated:

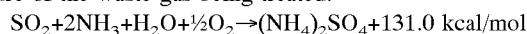
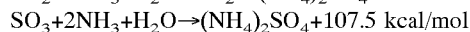
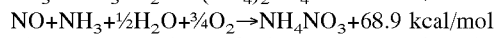

The exposure dose of electron beams is selected in consideration of the concentrations of $SO_x$ and $NO_x$ in the waste gas and the degree by which they should be removed. The applied electron is eventually converted to heat which elevates the temperature of the waste gas being treated.

The amount of heat generated by electron beam in kcal $$= \frac{\text{the mass of waste gas in kg} \times \text{the absorbed dose in } kGy}{4.1855}$$

where 4.1855 is the mechanical equivalent of heat in kJ/kcal.

When treating waste gases that result from the combustion of fuels such as coal and petroleum or those which result from the sintering of irons and steels, water is required in almost all cases to be used in amounts that take the above-described conditions into consideration.

The amount of air to be used is determined by various factors such as the amount of water to be sprayed, the desired size of water drops and the pressure of water and air but eventually it lies within the aforementioned range of the ratio between water and the gaseous mixture, i.e., 0.1–20 L/m$^3$.

When treating a waste gas containing sulfur oxides by first adding ammonia and then exposing the gas to an electron beam so as to remove the sulfur oxides from the gas, the reaction with ammonia is considered to take place in one of two ways: the $SO_2$ and $SO_3$ contained in the waste gas react directly with ammonia according to the schemes (1) and (2) set forth below or, alternatively, $SO_2$ is oxidized to $SO_3$ by radicals such as 0° and OH° that have been generated upon exposure to the electron beam, which $SO_3$ then reacts with ammonia according to the scheme (2). As can be seen from the fact that both schemes (1) and (2) include $NH_3$ and $H_2O$ on the left side of the equation, either reaction will progress smoothly at the increasing concentrations of ammonia and water but at the decreasing temperature of the waste gas to be treated:

$$SO_2 + 2NH_3 + H_2O + \tfrac{1}{2}O_2 \rightarrow (NH_4)_2SO_4 \quad (1)$$

$$SO_3 + 2NH_3 + H_2O \rightarrow (NH_4)_2SO_4 \quad (2)$$

Ammonium sulfamate, on the other hand, is considered to result when $SO_2$ reacts, according to the scheme (3) set forth below, with ammonia and the OH° radical which has been generated upon exposure to the electron beam. The right side of the equation (3) includes $H_2O$, so it can be seen that the reaction of interest is retarded at the increasing concentration of water in the waste gas to be treated:

$$SO_2 + 2OH + 2NH_3 \rightarrow NH_2SO_3NH_4 + H_2O \quad (3)$$

In the present invention, water is sprayed after it has been mixed with the already prepared gaseous mixture of ammonia gas and air, so the temperature on the surfaces of the resulting minute droplets of aqueous ammonia becomes much lower than that of the ambient gas on account of water evaporation and the humidity is in a nearly saturated state. What is more, aqueous ammonia evaporates simultaneously with water on the surfaces of those droplets of ammonia, accelerating the reaction of scheme (1) or (2) to proceed at a very fast rate. On the other hand, the reaction of scheme (3) will be retarded due to the high concentration of water.

As a result, efficient desulfurization can be achieved even if the waste gas to be treated has a comparatively high temperature and, what is more, the formation of ammonium sulfamate can be suppressed.

When spraying a mixture of water with the gaseous mixture of ammonia gas and air, a preliminarily formed gas-liquid mixture of ammonia, air and water could be sprayed but in this case it is difficult to vary the amounts of injection of water and ammonia independently of each other in accordance with the temperature of the waste gas to be treated and the concentrations of sulfur oxides present in the gas and there is the additional problem that a large-scale facility is required for storing ammonia in the form of an aqueous solution. No such problems will occur if ammonia is first mixed with air such that the resulting gaseous mixture is further mixed with water in the gas-liquid mixing compartment of a two-fluid nozzle before final spraying into the reactor is performed.

When ammonia gas is mixed with air, the carbon dioxide and water in the air react with ammonia to form ammonium bicarbonate or ammonium carbonate, which can potentially clog the mixing pipe. These compounds will either solidify or absorb moisture to become a highly viscous liquid, which will build up in the pipe and eventually cause clog. As a result of various tests conducted by the present inventors using ordinary air, it has been found that the problem of pipe clogging can be prevented by heating the pipe at a temperature of 60° C. and above throughout the period from the mixing of ammonia with air to the mixing of the resulting gaseous mixture with water to form a gas-liquid mixture. To this end, steam, an electric heater or any other suitable heat source may be employed.

The pressure of the gas (the gaseous mixture of air and ammonia gas) at the two-fluid nozzle is typically set at 1–10 kgf/cm$^2$, preferably 3–5 kgf/cm$^2$. Before mixing ammonia gas with air, the ammonia feed pipe is desirably heated by a suitable means such as steam or an electric heater to insure that the ammonia flowing through it will not liquefy at low ambient air temperature, namely to maintain the ammonia in a gaseous state.

The degree of heating the ammonia feed pipe should be varied as specified below since at higher pressures, ammonia tends to liquefy even if the temperature is high:

| Pressure, kgf/cm$^2$ | Temperature, °C. |
|---|---|
| 1 | ≧ about −35 |
| 3 | ≧ about −10 |
| 5 | ≧ about 3 |
| 10 | ≧ about 23 |

The following examples are provided for the purpose of further illustrating the invention but are in no way to be taken as limiting.

EXAMPLE 1

An experiment for the treatment of a waste gas by exposure to an electron beam was conducted in accordance with the flow sheet of the invention method shown in FIG. 1 which comprises first preparing a gaseous mixture of ammonia gas and air, then mixing it with water to form a gas-liquid mixture, and spraying the latter into a reactor.

A waste gas (12,500 m$^3$N/h) from a boiler 1 that contained 800 ppm of sulfur oxides and 200 ppm of nitrogen oxides was cooled to 110° C. by means of an air preheater 2 and a gas heater 3, further cooled down to 60° C. in a water-sprayed cooling tower 4, and directed into a reactor 5. In a separate step, 0.92 eq. of ammonia gas (20 m$^3$N/h) as supplied from an ammonia feeder 6 was mixed with air (1000 m$^3$N/h) in a line mixer 7; the resulting gaseous mixture was mixed with water in the gas-liquid mixing compartment of a two-fluid nozzle 8 and the resulting gas-liquid mixture was sprayed at the entrance of the reactor 5 as it was exposed to a shower of electron beams (12 kGy) from an electron beam accelerator 9. In the experiment, water was supplied in varying amounts from 50 kg/h to 200 kg/h so as to change the temperature at the exit of the reactor 5, which was found to have a relationship with the efficiency of desulfurization as indicated by a solid line in FIG. 4. The concentration of ammonium sulfamate in the by-product ammonium sulfate was 0.05%, which would be no problem at all when the by-product was to be used as a fertilizer.

COMPARATIVE EXAMPLE 1

Figure 2:
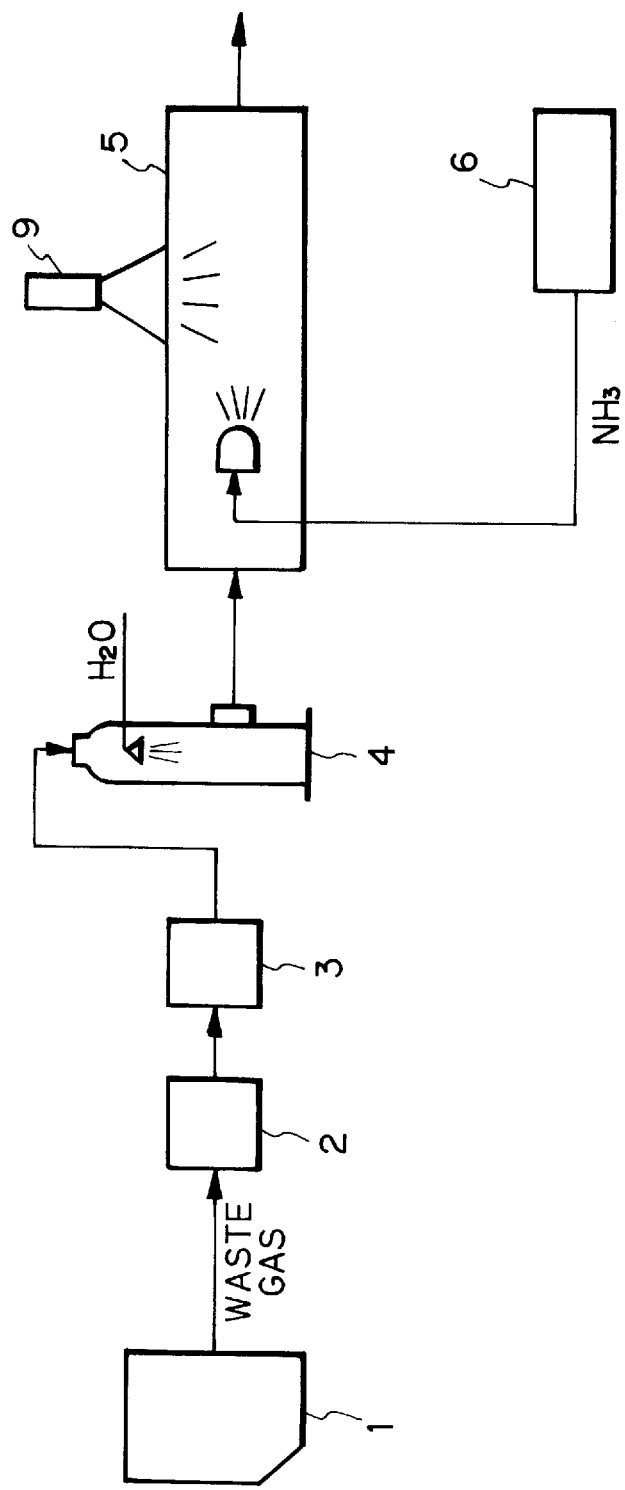
FIG. 2 is a flow sheet for the prior art method of treating waste gases by exposure to an electron beam which comprises adding ammonia gas alone into a reactor.
Figure 3:
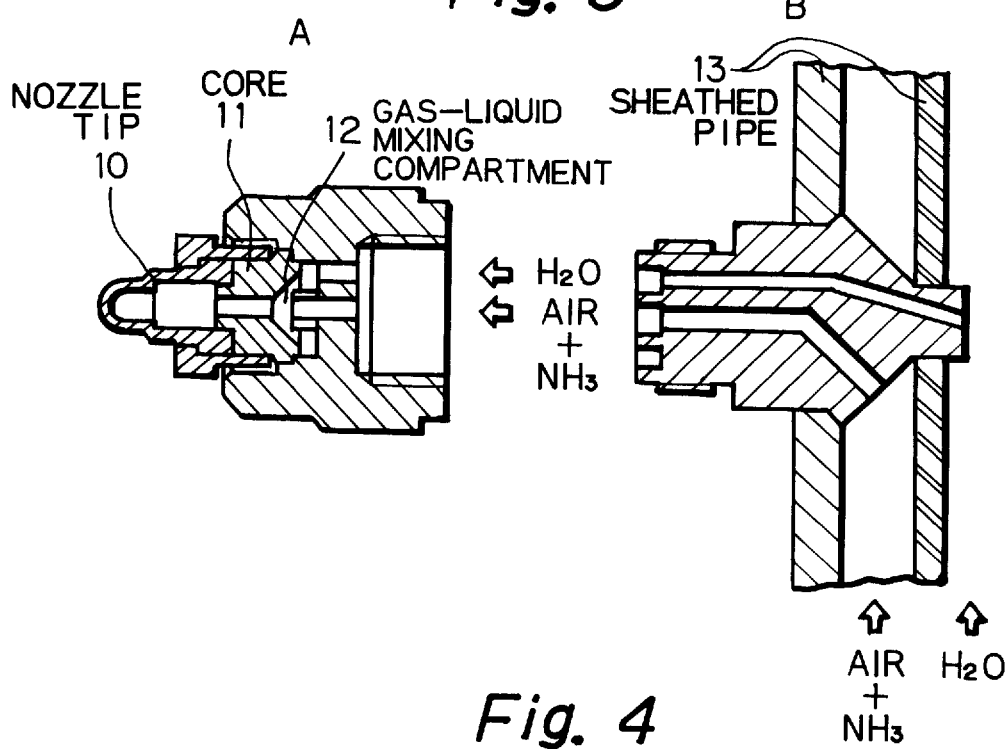
FIG. 3A shows an example of the two-fluid nozzle that can be used in the invention.
FIG. 3B shows an example of the adapter for use with the two-fluid nozzle.

The gas-liquid mixture used in Example 1 which consisted of ammonia gas, air and water was replaced by ammonia gas alone and an experiment for the treatment of a waste gas by exposure to an electron beam was conducted in accordance with the flow sheet for the conventional method shown in FIG. 2.

Figure 4:
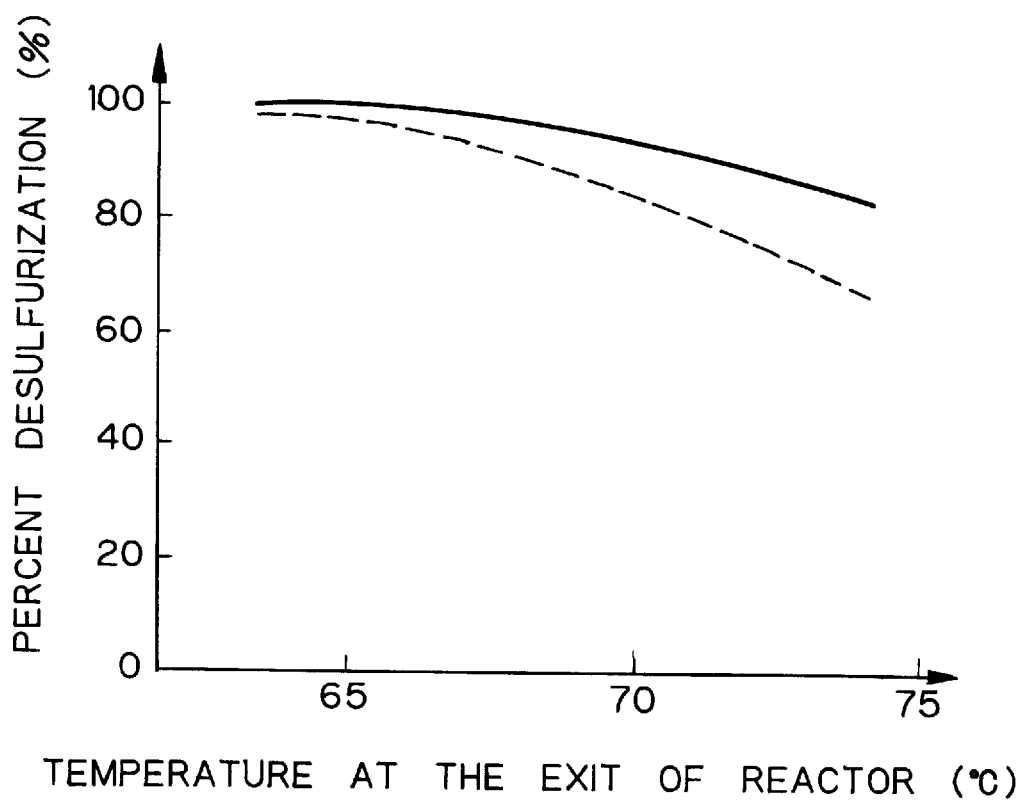
FIG. 4 is a graph showing the relationship between the temperature of a waste gas of interest at the exit of the reactor and the percent desulfurization for Example 1 and Comparative Example 1.

A waste gas as generated from a boiler 1 was passed through an air preheater 2 and a gas heater 3 to provide the same temperature and concentration conditions as in Example 1. The thus treated waste gas was cooled in a water-sprayed tower 4. The amount of water sprayed in the tower 4 was varied to adjust the temperature at the exit of a reactor 5. Ammonia (20 m³N/h) supplied from an ammonia feeder 6 was injected as a gas into the reactor 5. The waste gas introduced into the reactor 5 was exposed to a shower of electron beam (12 kGy) from an electron beam accelerator 7. The relationship between the temperature at the exit of the reactor and the efficiency of desulfurization is as shown in FIG. 4 by a broken line. The concentration of ammonium sulfamate in the by-product ammonium sulfate was 2.0%, which was too high to warrant direct use of the by-product as a fertilizer.

EXAMPLE 2

The procedure of Example 1 was repeated, except that the temperature of the pipe from the mixing of ammonia gas with air to the mixing of said gaseous mixture with water to form a gas-liquid mixture was varied at 60° C., 70° C., 80° C. and 100° C. The experimental setup was operated at each of those temperatures for several weeks without any problem of pipe clogging.

COMPARATIVE EXAMPLE 2

The procedure of Example 2 was repeated, except that the temperature of the pipe from the mixing of ammonia gas with air to the mixing of said gaseous mixture with water to form a gas-liquid mixture was held at 40° C. or ordinary temperature (about 20° C.). The pipe clogged in a few days of operation.

According to the invention, effective desulfurization can be realized even if the temperature of a waste gas being treated is fairly high at the exit of the reactor and it is capable of reducing the concentration of ammonium sulfamate in the by-product ammonium sulfate.

What is claimed is:

1. In a method for treating waste gases by exposure to electron beams which comprises adding ammonia to a waste gas containing sulfur oxide ($SO_x$) and/or nitrogen oxides ($NO_x$) and thereafter exposing the gas to an electron beam so as to remove the sulfur oxides and/or nitrogen oxides therefrom, the improvement comprising first mixing ammonia gas uniformly with air to provide a gaseous mixture, then forming a homogeneous gas-liquid mixture from said gaseous mixture and water, and spraying said homogeneous gas-liquid mixture into a reactor.

2. A method according to claim 1, wherein the ratio of water to the gaseous mixture of ammonia gas and air is within the range from 0.1 to 20 L/m³, the amount of ammonia in the gaseous mixture being at the level necessary to convert the sulfur oxides and/or nitrogen oxides in the gaseous mixture to ammonium sulfate and/or ammonium nitrate, respectively, and the amount of water being at the level necessary to adjust the temperature of the waste gas at the exit of the reactor to lie within the range from the dew point of water to no more than 100° C.

3. A method according to claim 1 or 2, wherein the temperature of piping is held at 60° C. or above throughout the period from the mixing of ammonia gas with air to the mixing of the resulting mixture with water to form a gas-liquid mixture.

4. In an apparatus for treating waste gases by exposure to electron beams which comprises means for providing a waste gas stream containing sulfur oxides and nitrogen oxides coupled to a reactor equipped with a means for providing an electron beam, the improvement comprising a gas-gas mixer for mixing ammonia gas and air, and a two-fluid nozzle comprising a gas-liquid mixing compartment, such that a uniform gaseous mixture of ammonia gas and air formed in the gas-gas mixer can be mixed with water to form a homogeneous gas-liquid mixture, and a sprayer for spraying said homogeneous gas-liquid mixture into said reactor.

5. In the apparatus of claim 4, wherein the improvement further comprises means for keeping a ratio of water to said uniform gaseous mixture of ammonia gas and air in a range of from 0.1 to 20 L/m³, means for keeping the amount of ammonia in said uniform gaseous mixture at a level necessary to convert the sulfur oxides and/or nitrogen oxides in said uniform gaseous mixture to ammonium sulfate and/or ammonium nitrate, respectively, and means for keeping the amount of water at a level necessary to adjust the waste gas stream at an exit from the reactor to a temperature in a range of from the dew point of water to no more than 100° C.

6. In the apparatus of claim 4, wherein the improvement further comprises means for maintaining a temperature of piping at 60° C. or above during a period from when said uniform gaseous mixture is formed through when said homogeneous gas-liquid mixture is formed.

* * * * *